United States Patent
Abe (10) Patent No.: US 12,461,697 B2
(45) Date of Patent: Nov. 4, 2025

(54) IMAGE PROCESSING APPARATUS PERFORMS MASKING PROCESSING TO PREVENT LEAKAGE OF AN IMAGE GENERATED BY PRINTING PROCESS, IMAGE PROCESSING SYSTEM, NON-TRANSITORY COMPUTER READABLE MEDIUM STORING IMAGE PROCESSING PROGRAM, AND IMAGE PROCESSING METHOD

(71) Applicant: FUJIFILM Business Innovation Corp., Tokyo (JP)

(72) Inventor: Masaki Abe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 468 days.

(21) Appl. No.: 17/891,094

(22) Filed: Aug. 18, 2022

(65) Prior Publication Data

US 2023/0305770 A1 Sep. 28, 2023

(30) Foreign Application Priority Data

Mar. 22, 2022 (JP) ................................ 2022-046007

(51) Int. Cl.
*G06F 3/12* (2006.01)
*G06K 15/10* (2006.01)
*H04N 1/44* (2006.01)

(52) U.S. Cl.
CPC .......... *G06F 3/1238* (2013.01); *G06F 3/1222* (2013.01); *G06K 15/107* (2013.01); *H04L 2209/605* (2013.01); *H04N 1/4453* (2013.01)

(58) Field of Classification Search
None
See application file for complete search history.

(56) References Cited

U.S. PATENT DOCUMENTS

| 10,509,913 B2 | 12/2019 | Mashimo |
| 11,567,715 B1* | 1/2023 | Shiomi ................ G06F 3/1267 |
| 2009/0185235 A1* | 7/2009 | Ebitani ................ G06F 21/608 358/1.14 |
| 2009/0271839 A1 | 10/2009 | Kanai et al. |
| 2015/0055162 A1* | 2/2015 | Nakajima ............. G06F 21/608 358/1.13 |
| 2019/0132481 A1* | 5/2019 | Yasui ..................... H04N 1/444 |

FOREIGN PATENT DOCUMENTS

| JP | 2004260750 | 9/2004 |
| JP | 2007188477 | 7/2007 |
| JP | 2007299322 | 11/2007 |
| JP | 2015226298 | 12/2015 |
| JP | 2018078497 | 5/2018 |

OTHER PUBLICATIONS

Machine Translation in English of JP Pub 2015-226298 published on Dec. 14, 2015 to Morita Akemi.*
"Search Report of Europe Counterpart Application", issued on Aug. 16, 2023, p. 1-p. 8.

* cited by examiner

*Primary Examiner* — Haris Sabah
(74) *Attorney, Agent, or Firm* — JCIPRNET (57) ABSTRACT

An image processing apparatus includes a processor configured to: in a case of printing data to be printed, perform masking processing on a predetermined concealed portion according to a predetermined access policy; and perform a process of embedding and outputting inquiry information for inquiring about the concealed portion in the data to which the masking processing has been performed.

9 Claims, 8 Drawing Sheets

| DOCUMENT ID | ACCESS POLICY ID | MASKING NECESSITY | MASKING CONTENT |
|---|---|---|---|
| DOCUMENT 001 | AP-0001 | false | |
| DOCUMENT 002 | AP-0002 | true | KEYWORD ID-001 |

FIG. 9

| KEYWORD ID | KEYWORD 1 | KEYWORD 2 | KEYWORD 3 |
|---|---|---|---|
| 001 | SALES | CONTRACTOR | XXXX CORPORATION |
| 002 | FUJIFILM | PATENT | UTILITY MODEL |

| IS DATA THAT USER WANTS TO CHECK ACCESSIBLE? | DOES ACCESS POLICY ID OF TWO-DIMENSIONAL CODE FOR CHECKING EXIST? | ARE CURRENT ACCESS POLICY ID AND ACCESS POLICY ID OF TWO-DIMENSIONAL CODE SAME? | ARE MASKING RESULT OF CURRENT DATA AND READ DATA SAME? | DISPLAYABILITY |
|---|---|---|---|---|
| ACCESSIBLE | YES | SAME | SAME | DISPLAYABLE WITHOUT MASKING |
| ACCESSIBLE | YES | SAME | DIFFERENT | UNDISPLAYABLE |
| ACCESSIBLE | YES | DIFFERENT | - | DISPLAYABLE WITH MASKING |
| ACCESSIBLE | NO | - | - | UNDISPLAYABLE |
| INACCESSIBLE | - | - | - | UNDISPLAYABLE |

…

IMAGE PROCESSING APPARATUS PERFORMS MASKING PROCESSING TO PREVENT LEAKAGE OF AN IMAGE GENERATED BY PRINTING PROCESS, IMAGE PROCESSING SYSTEM, NON-TRANSITORY COMPUTER READABLE MEDIUM STORING IMAGE PROCESSING PROGRAM, AND IMAGE PROCESSING METHOD

CROSS-REFERENCE TO RELATED APPLICATIONS

This application is based on and claims priority under 35 USC 119 from Japanese Patent Application No. 2022-046007 filed Mar. 22, 2022.

BACKGROUND

(i) Technical Field

The present disclosure relates to an image processing apparatus, an image processing system, a non-transitory computer readable medium storing an image processing program, and an image processing method.

(ii) Related Art

JP2007-188477A proposes a data processing apparatus that acquires policy information for authenticating a job requester from a policy server, adds, to a job, first policy information acquired or second policy information including the first policy information and additional information input by a user, and transfers the job to which the first or second policy information is added to an image forming apparatus.

JP2018-078497A proposes an image forming system including: a concealment word registration unit that registers a concealment word in association with a user; an ID information acquisition unit that acquires creator ID information and executor ID information from a print job, the creator ID information specifying a user as a creator of a document file, the executor ID information specifying a user as an executor of image forming processing; a concealment word management unit that uses the concealment words to decide a concealment region based on an input from the user, the concealment words including the concealment word associated with the user specified by the creator ID information and the concealment word associated with the user specified by the executor ID information, the concealment region being a region to be concealed in an image generated using the print job; and an image forming unit that executes masking processing to form an image on which the masking processing has been performed, the masking processing making the concealment region illegible.

JP2007-299322A proposes a document security system in which a process requested by a user is executed in a case where the user is permitted to use a device based on a user's using right of the device and to use a document based on a user's using right of the document, and a follow-up obligation is executed corresponding to the type of the document acquired from image data of the document.

SUMMARY

In a case where access to data is restricted, it is possible to prevent information leakage in a concealed portion of an image generated by printing by performing masking processing on the concealed portion and printing. However, in a case where a user whose access to a concealed portion of a printed matter is not restricted receives a masked printed matter, he/she cannot check the concealed portion because he/she does not know where original data is. In order to check the masked concealed portion, processing such as requesting the user who created the data to print the original data that has not been masked is required.

Aspects of non-limiting embodiments of the present disclosure relate to an image processing apparatus, an image processing system, a non-transitory computer readable medium storing an image processing program, and an image processing method capable of checking a concealed portion in a case where a user whose access to the masked concealed portion of a printed matter is not restricted receives the masked printed matter.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a processor configured to: in a case of printing data to be printed, perform masking processing on a predetermined concealed portion according to a predetermined access policy; and perform a process of embedding and outputting inquiry information for inquiring about the concealed portion in the data to which the masking processing has been performed.

BRIEF DESCRIPTION OF THE DRAWINGS

Exemplary embodiment(s) of the present invention will be described in detail based on the following figures, wherein.

DETAILED DESCRIPTION

Figure 1:
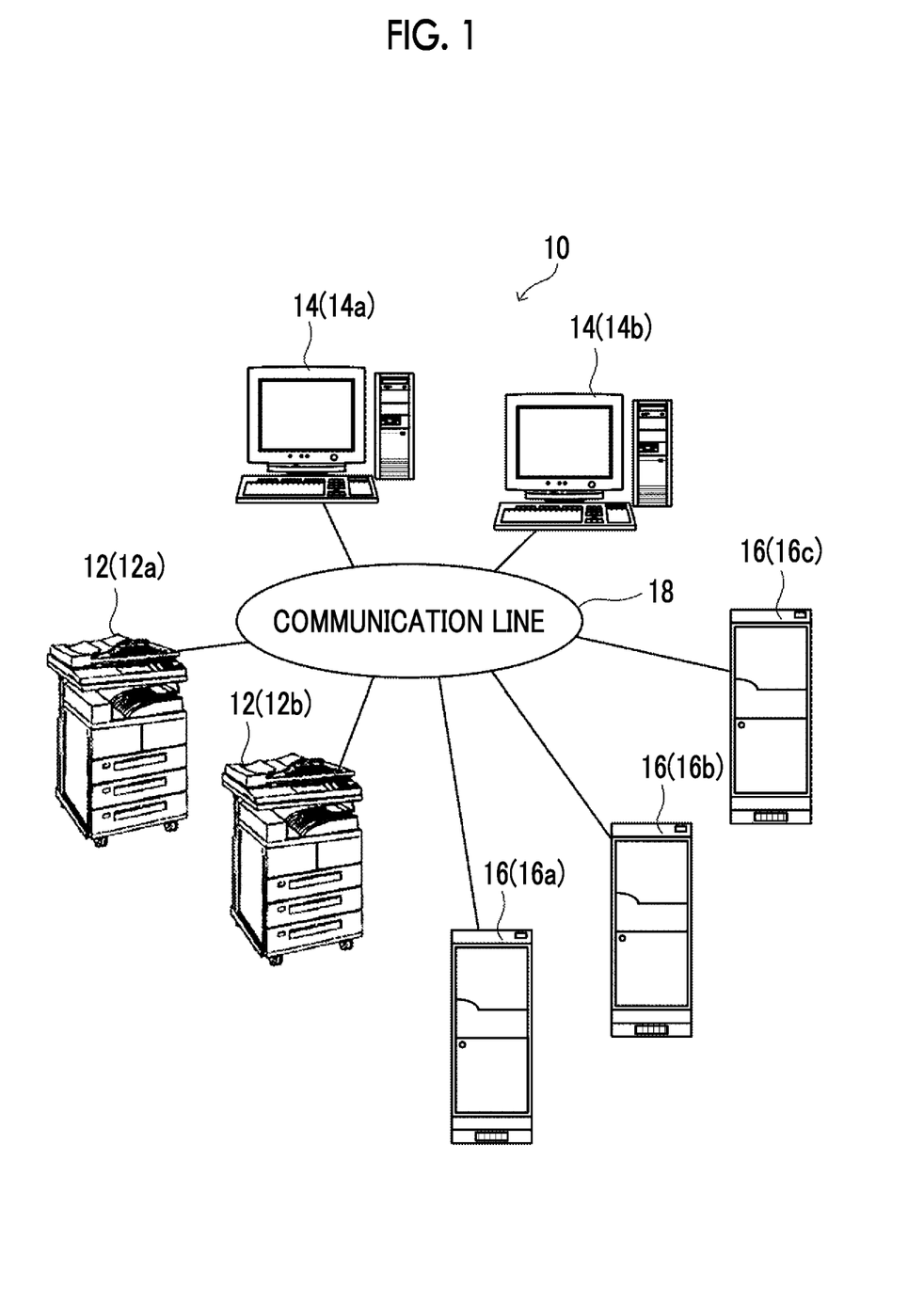
FIG. 1 is a diagram showing a schematic configuration of an information processing system according to the present exemplary embodiment.

Hereinafter, an example of the present exemplary embodiment will be described in detail with reference to the drawings. In the present exemplary embodiment, an information processing system in which a plurality of image forming apparatuses, a plurality of information processing terminals, and a plurality of servers are connected to each other via a communication line such as a network will be described as an example of an image processing system. FIG. 1 is a diagram showing a schematic configuration of an information processing system 10 according to the present exemplary embodiment.

As shown in FIG. 1, the information processing system 10 according to the present exemplary embodiment includes a plurality of image forming apparatuses 12a, 12b, . . . , a plurality of information processing terminals 14a, 14b, . . . , and a plurality of servers 16a, 16b, . . . . In a case where it is not necessary to separately describe between the image forming apparatuses 12a, 12b, . . . , the information processing terminals 14a, 14b . . . , and the servers 16a, 16b, . . . , the alphabet at the end of the reference numeral may be omitted. Further, in the present exemplary embodiment, an example in which the plurality of image forming apparatuses 12a, 12b, . . . , the plurality of information processing terminals 14a, 14b, . . . , and the plurality of servers 16a, 16b, . . . are provided will be described, but at least one of the image forming apparatus 12, the information processing terminal 14, or the server 16 may be one. Further, in the present exemplary embodiment, the case where the image forming apparatus 12 is used as an example of an image processing apparatus will be described.

The image forming apparatus 12, the information processing terminal 14, and the server 16 are connected to each other via a communication line 18 such as a local area network (LAN), a wide area network (WAN), the Internet, and an intranet. Each of the image forming apparatus 12, the information processing terminal 14, and the server 16 can transmit and receive various data to and from each other via the communication line 18.

Figure 2:
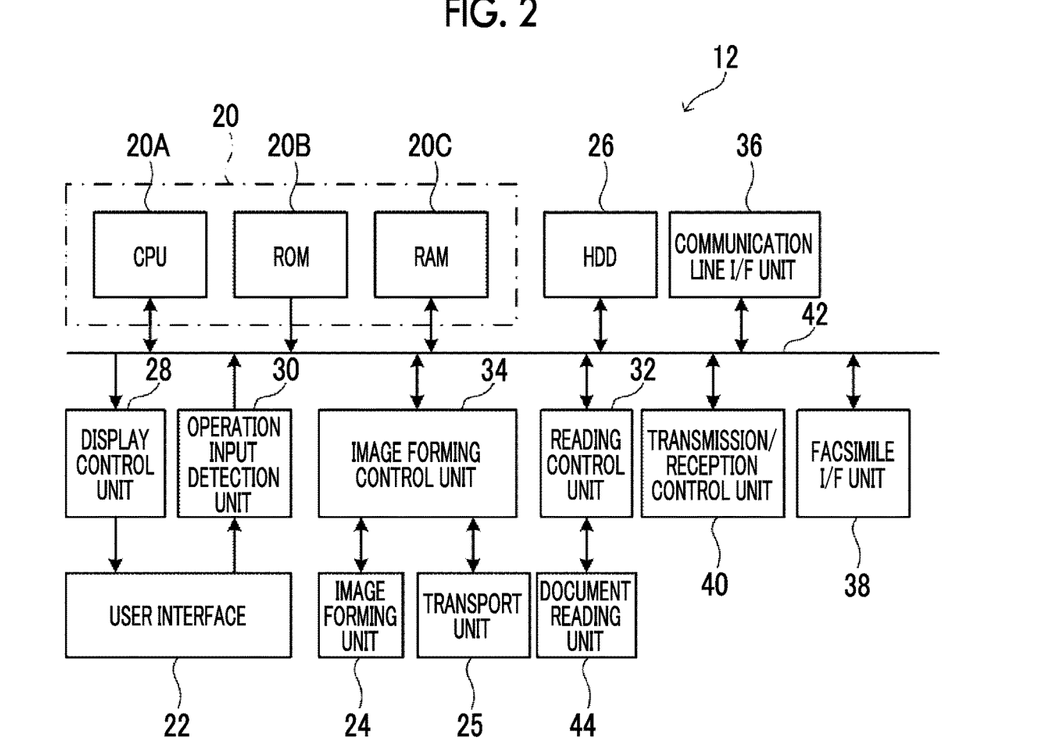
FIG. 2 is a block diagram showing a configuration of a principal part of an electrical system of an image forming apparatus according to the present exemplary embodiment.

FIG. 2 is a block diagram showing a configuration of a principal part of an electrical system of the image forming apparatus 12 according to the present exemplary embodiment.

As shown in FIG. 2, the image forming apparatus 12 according to the present exemplary embodiment includes a control unit 20 including a central processing unit (CPU) 20A, a read only memory (ROM) 20B, and a random access memory (RAM) 20C. The CPU 20A controls the overall operation of the image forming apparatus 12. The RAM 20C is used as a work area or the like when executing various programs by the CPU 20A. The ROM 20B stores various control programs, various parameters, and the like in advance. Also, in the image forming apparatus 12, each part of the control unit 20 is electrically connected by a system bus 42.

On the other hand, the image forming apparatus 12 according to the present exemplary embodiment includes a hard disk drive (HDD) 26 that stores various data such as user information, setting parameters, and various information related to linked services, and application programs such as image processing programs. Further, the image forming apparatus 12 includes a display control unit 28 that is connected to a user interface 22 and controls the display of various operation screens and the like on a display of the user interface 22. Further, the image forming apparatus 12 includes an operation input detection unit 30 that is connected to the user interface 22 and detects an operation instruction input via the user interface 22. Also, in the image forming apparatus 12, the HDD 26, the display control unit 28, and the operation input detection unit 30 are electrically connected to the system bus 42. In the image forming apparatus 12 according to the present exemplary embodiment, the HDD 26 is applied as a storage unit, but the present disclosure is not limited thereto, and a non-volatile storage unit such as a flash memory may be applied.

Further, the image forming apparatus 12 according to the present exemplary embodiment includes a reading control unit 32 that controls an optical image reading operation by a document reading unit 44 and a document feeding operation by a document transport unit, and an image forming control unit 34 that controls image forming processing by an image forming unit 24 and the transport of sheets to the image forming unit 24 by a transport unit 25. Further, the image forming apparatus 12 includes a communication line interface (I/F) unit 36 that is connected to the communication line 18 and transmits/receives communication data to/from another external device such as the server 16 connected to the communication line 18. Further, the image forming apparatus 12 includes a facsimile interface (I/F) unit 38 that is connected to a telephone line (not shown) and transmits/receives facsimile data to/from a facsimile device connected to the telephone line. Further, the image forming apparatus 12 includes a transmission/reception control unit 40 that controls transmission/reception of facsimile data via the facsimile I/F unit 38. In the image forming apparatus 12, the transmission/reception control unit 40, the reading control unit 32, the image forming control unit 34, the communication line I/F unit 36, and the facsimile I/F unit 38 are electrically connected to the system bus 42. Although not shown, the image forming apparatus 12 includes a configuration for acquiring user information such as a card reader for performing user authentication and the like.

With the above configuration, the image forming apparatus 12 according to the present exemplary embodiment uses the CPU 20A to access the RAM 20C, the ROM 20B, and the HDD 26. Further, the image forming apparatus 12 uses the CPU 20A to control the display of an operation screen and information such as various messages on the display of the user interface 22 via the display control unit 28. Further, the image forming apparatus 12 uses the CPU 20A to control the operation of the document reading unit 44 and the document transport unit via the reading control unit 32. Further, the image forming apparatus 12 uses the CPU 20A to control the operation of the image forming unit 24 and the transport unit 25 via the image forming control unit 34 and to control the transmission/reception of communication data via the communication line I/F unit 36. Further, the image forming apparatus 12 uses the CPU 20A to control the transmission/reception of facsimile data via the facsimile I/F unit 38 by the transmission/reception control unit 40. Further, the image forming apparatus 12 uses the CPU 20A to ascertain the operation content in the user interface 22 based on the operation information detected by the operation input detection unit 30, and to execute various controls based on the operation content.

Figure 3:
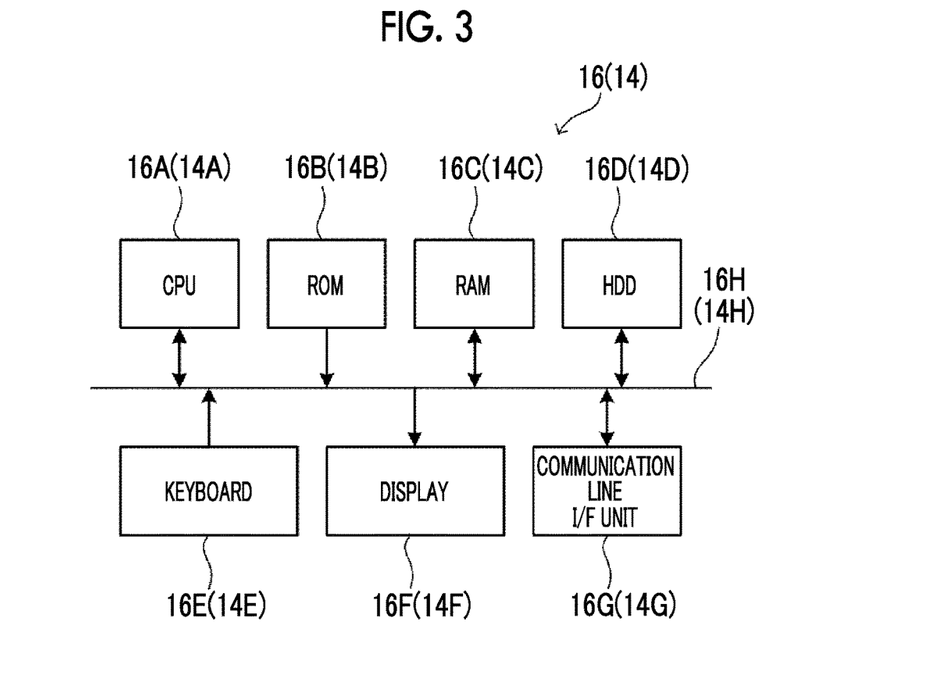
FIG. 3 is a block diagram showing a configuration of a principal part of an electrical system of an information processing terminal and a server according to the present exemplary embodiment.

Subsequently, the configuration of the principal parts of the electrical system of the information processing terminal 14 and the server 16 according to the present exemplary embodiment will be described. FIG. 3 is a block diagram showing the configuration of the principal parts of the electrical system of the information processing terminal 14 and the server 16 according to the present exemplary embodiment. Since the information processing terminal 14 and the server 16 basically have a general computer configuration, the server 16 will be described here as a representative.

As shown in FIG. 3, the server 16 according to the present exemplary embodiment includes a CPU 16A, a ROM 16B, a RAM 16C, an HDD 16D, a keyboard 16E, a display 16F, and a communication line interface (I/F) unit 16G. The CPU 16A controls the overall operation of the server 16. The ROM 16B stores various control programs, various parameters, and the like in advance. The RAM 16C is used as a work area or the like when executing various programs by the CPU 16A. The HDD 16D stores various data, application programs, and the like. The keyboard 16E is used to input various information. The display 16F is used to display various information. The communication line I/F unit 16G is connected to the communication line 18 and transmits/receives various data to/from other devices connected to the communication line 18. Each part of the above server 16 is electrically connected to each other by the system bus 16H. In the server 16 according to the present exemplary embodiment, the HDD 16D is applied as a storage unit, but the present disclosure is not limited thereto, and another non-volatile storage unit such as a flash memory may be applied.

With the above configuration, the server 16 according to the present exemplary embodiment uses the CPU 16A to access the ROM 16B, the RAM 16C, and the HDD 16D, acquire various data via the keyboard 16E, and display various information on the display 16F. Further, the server 16 uses the CPU 16A to control the transmission/reception of communication data via the communication line I/F unit 16G.

In the information processing system 10 according to the present exemplary embodiment configured as described above, a zero trust network is constructed and operated. Note that, the zero trust is a network model based on the premise that "all access is not trusted".

Figure 4:
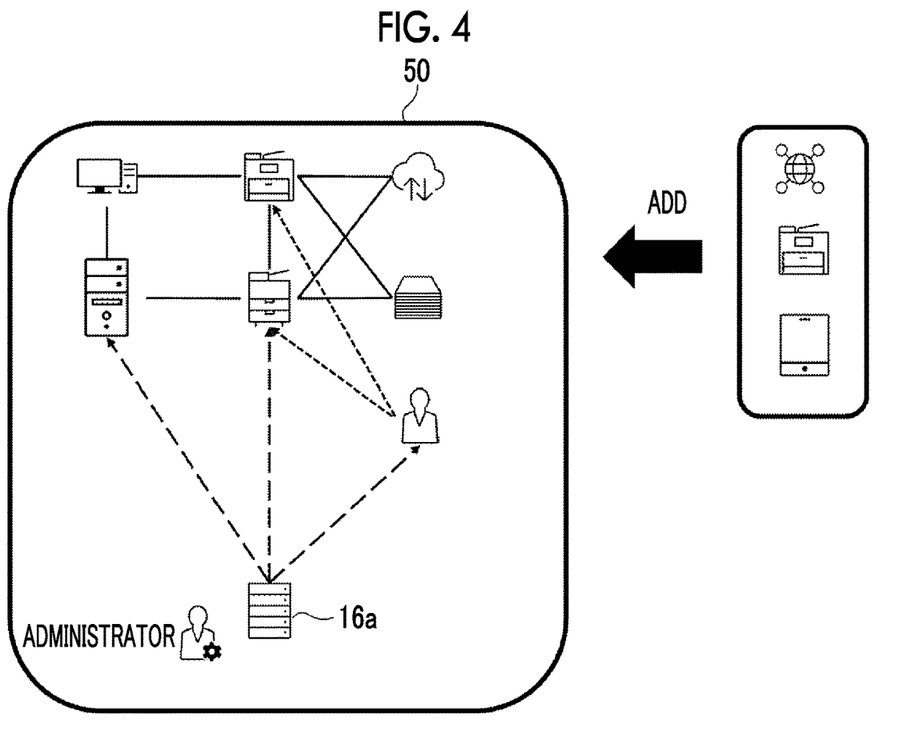
FIG. 4 is a diagram illustrating a zero trust network constructed and operated in the information processing system according to the present exemplary embodiment.

As shown in FIG. 4, in the zero trust network 50, in a case where an application, a device, or the like is added to the zero trust network 50, access to resources built into the system (devices, applications, or the like) is restricted by access policies set by an administrator. The access policy is determined by a single resource, mutual relationships between resources, and an accessing entity (user, application, or device), and is managed by the policy management server 16a. In addition, by dynamically evaluating the access policy each time a resource is accessed, whether or not the user has the authority is determined, and whether or not the processing is permitted is determined.

Figure 5:
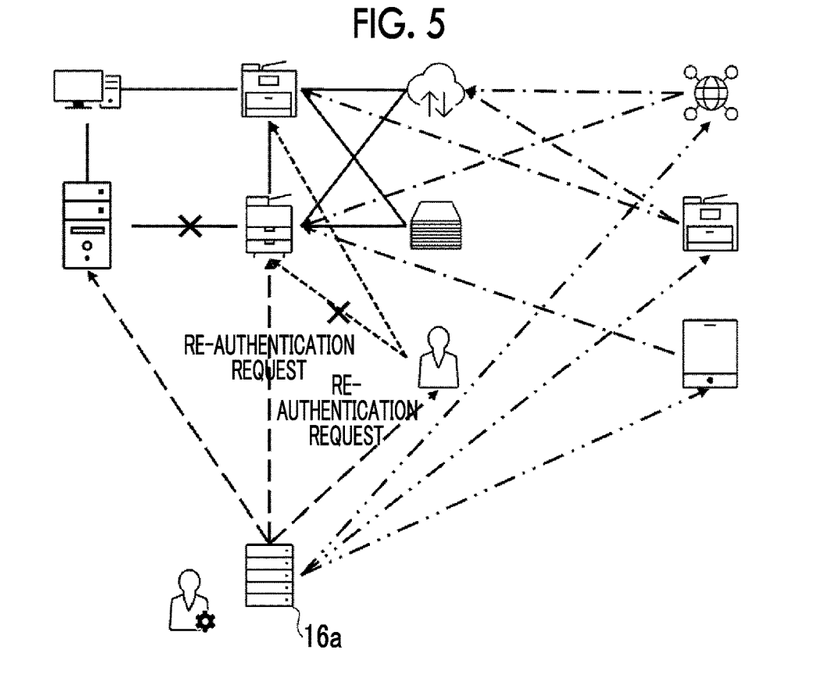
FIG. 5 is a diagram illustrating an access policy in a case where a new device or application is added in the zero trust network.

By adding new devices and applications, it is necessary to create a new access policy, for example, as indicated by one-dot chain lines and two-dot chain lines in FIG. 5. In a case where the new access policy does not affect the existing access policy, the currently operating process continues as it is. On the other hand, in a case where the new access policy affects the existing access policy, the target access policy is updated, the process is stopped because the current access policy is invalid, and each resource is notified that re-authentication is required.

Figure 6:
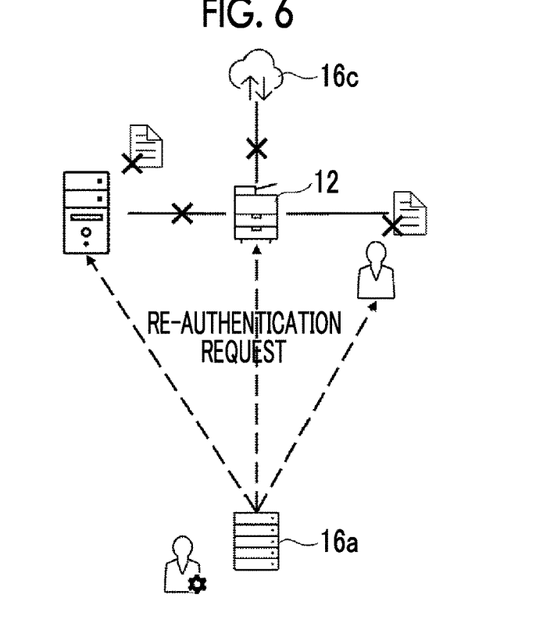
FIG. 6 is a diagram illustrating problems in a case where the access policy is changed.

In the existing access policy, in a case where the access to the document is permitted, the document can be accessed, and therefore the user prints the document from the image forming apparatus 12. However, in a case where the access policy is changed during printing and the access right to the document is lost as shown in FIG. 6, the printing process is interrupted at the stage at which re-authentication is required, but the printed document remains as it is. Therefore, there is a problem that the content of the document that should not be accessible can be checked or redistributed. The information processing system 10 according to the present exemplary embodiment addresses such a problem.

Figure 7:
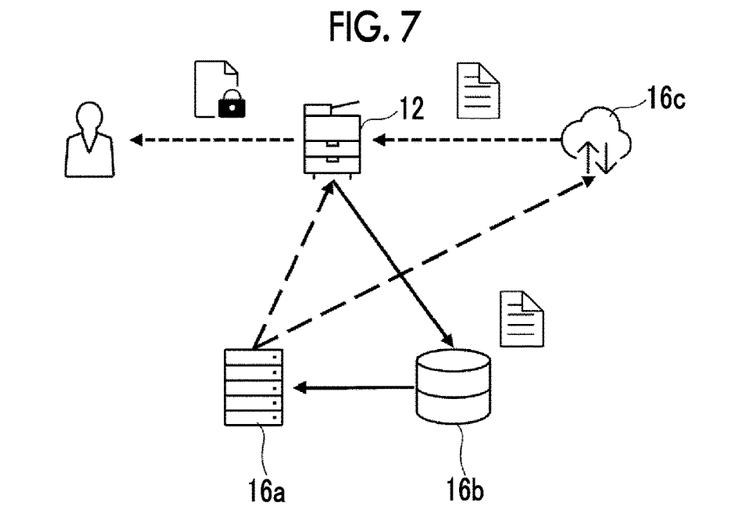
FIG. 7 is a diagram showing a detailed configuration of the information processing system according to the present exemplary embodiment.

The details of the information processing system 10 according to the present exemplary embodiment will be described. FIG. 7 is a diagram showing a detailed configuration of the information processing system 10 according to the present exemplary embodiment.

In the present exemplary embodiment, the plurality of servers 16 described above include a policy management server 16a, a confidential information management server 16b, and a cloud server 16c.

The policy management server 16a manages an access policy decided by a single resource, mutual relationships between resources, and an accessing entity.

The confidential information management server 16b performs a process of checking the necessity of masking with a document by combining a document identification (ID) as an example of data identification information for identifying the document and an access policy ID as an example of access policy identification information for identifying an access policy. In addition, the confidential information management server 16b manages keywords for performing masking processing. For example, the confidential information management server 16b stores a correspondence table between a document and the necessity of masking shown in FIG. 8, a keyword table for masking shown in FIG. 9, and the like.

The cloud server 16c provides, for example, a document management service and performs a process of managing various documents.

In the information processing system 10 according to the present exemplary embodiment, when a user prints data or a document from the image forming apparatus 12, masking processing for masking a predetermined concealed portion is performed according to a predetermined access policy and printing is performed.

Further, when checking the masking content, the document as a printed matter printed from the image forming apparatus 12 is read, and the necessary portion is restored according to the access policy and displayed on the user interface 22 of the image forming apparatus 12.

Figure 10:
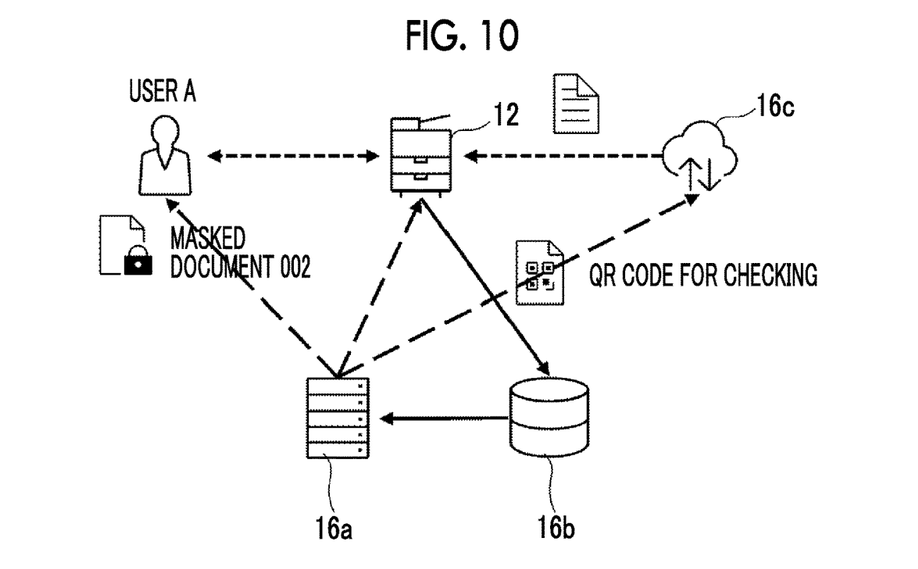
FIG. 10 is a diagram illustrating a flow in the case of outputting data in the information processing system according to the present exemplary embodiment.

Subsequently, in the information processing system 10 according to the present exemplary embodiment, a specific flow in the case of printing a document stored in the cloud server 16c will be described with reference to FIG. 10. FIG. 10 is a diagram illustrating a flow in the case of outputting data in the information processing system 10 according to the present exemplary embodiment.

First, a user A logs in to the system and instructs the image forming apparatus 12 to print the document stored in the cloud server 16c. The log-in to the system may be card authentication or authentication such as a personal identification number, or other various authentications such as biometric authentication may be applied.

In the case of printing the target document, the image forming apparatus 12 inquires of the confidential information management server 16b whether or not to perform masking with the combination of the document ID and the access policy ID.

Figure 8:
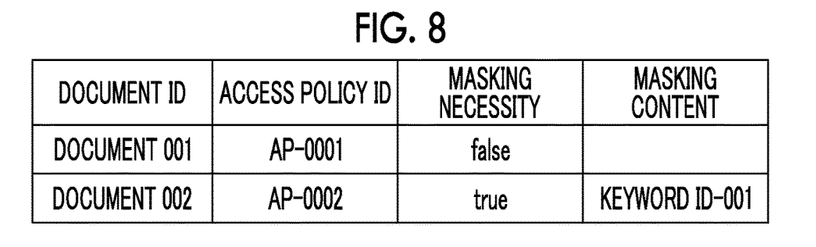
FIG. 8 is a diagram showing an example of a correspondence table between a document and the necessity of masking.
Figure 9:
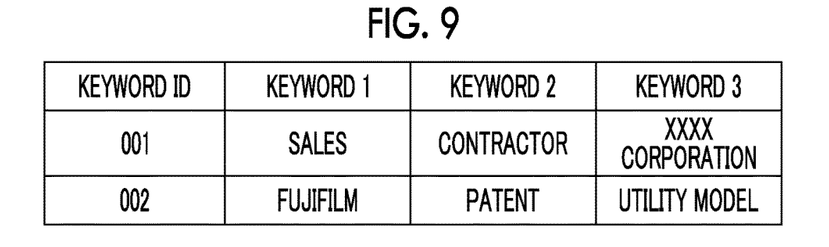
FIG. 9 is a diagram showing an example of a keyword table for masking.

The confidential information management server 16b checks the correspondence table between the document and the necessity of masking shown in FIG. 8 by combining the document ID and the access policy ID, and returns the check result of whether or not masking is necessary to the image forming apparatus 12. For example, in a case where the document ID is document 001 and the access policy ID is AP-0001, masking is not necessary, and in a case where the document ID is document 002 and the access policy ID is AP-0002, masking is necessary, and the content is the keyword ID-001.

Upon receiving the result, the image forming apparatus 12 acquires a list of keywords to be masked and a two-dimensional code for checking masking from the confidential information management server 16b. Then, the keyword portion is masked, and a two-dimensional code for checking masking is added to the document and printed. As the two-dimensional code, for example, a document ID that identifies the document to be printed and an access policy ID that identifies the applied access policy are recorded. The document and the two-dimensional code may be printed on different sheets, or the two-dimensional code may be added to the document and printed.

Figure 11:
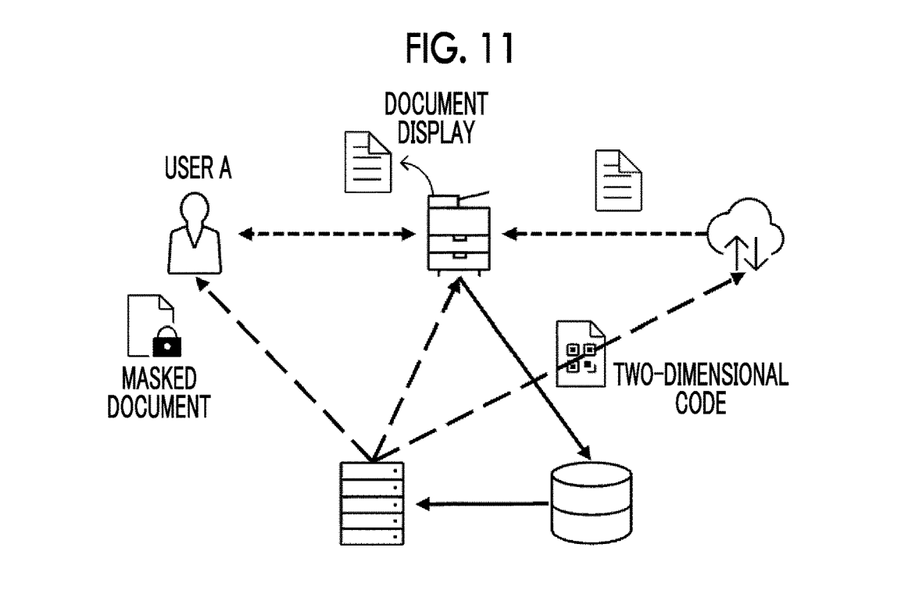
FIG. 11 is a diagram illustrating a flow in the case of checking the content of masking of a document in which a two-dimensional code is embedded in the information processing system according to the present exemplary embodiment.

Next, the flow for checking the content of masking of the document in which the two-dimensional code is embedded will be described. FIG. 11 is a diagram illustrating a flow in the case of checking the content of masking of a document in which a two-dimensional code is embedded in the information processing system 10 according to the present exemplary embodiment.

In a case where it is desired to remove the masking of the printed document and check the content as described above, the user A logs in to the system and reads the masked document from the image forming apparatus 12 belonging to the zero trust network 50.

The image forming apparatus 12 extracts the two-dimensional code from the read data and sends the two-dimensional code to the confidential information management server 16b.

The confidential information management server 16b extracts the document ID and the access policy ID from the two-dimensional code, and checks whether or not the user A who requested the processing can access the document on the cloud server 16c and whether or not the access policy ID exists. Note that, the image forming apparatus 12 may extract the document ID and the access policy ID from the two-dimensional code.

Further, the confidential information management server 16b checks the access policy at the time of log-in, evaluates the content of a policy check table (see FIG. 15) to be described later, and decides how to display the access policy.

Further, the confidential information management server 16b compares the result of masking the data on the system with the data read by the image forming apparatus 12, evaluates the content of the policy check table, and decides how to display the data. Then, the decided display content is transmitted to the image forming apparatus 12.

Upon receiving the result, the image forming apparatus 12 acquires a list of keywords to be masked and a two-dimensional code for checking from the confidential information management server 16b, masks the keyword portion, and displays the document on the user interface 22 of the image forming apparatus 12. Thereby, the document with content according to the access policy is displayed.

Subsequently, specific processing performed by the information processing system 10 according to the present exemplary embodiment will be described.

Figure 12:
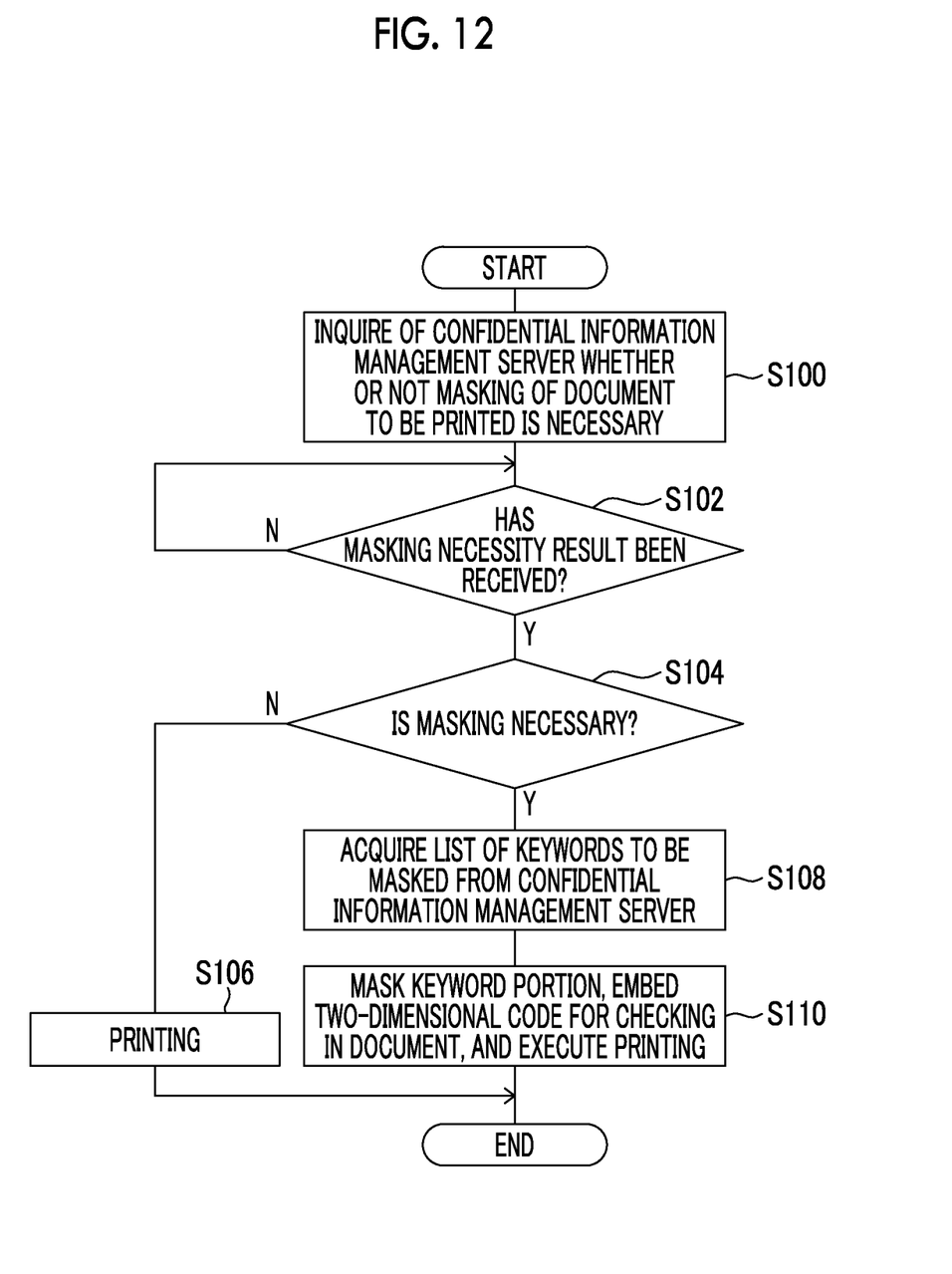
FIG. 12 is a flowchart showing an example of a flow of processing performed in the case of printing a document stored in a cloud server in the image forming apparatus of the information processing system according to the present exemplary embodiment.

First, processing performed by the image forming apparatus 12 in the case of printing a document stored in the cloud server 16c will be described. FIG. 12 is a flowchart showing an example of a flow of processing performed in the case of printing a document stored in the cloud server 16c in the image forming apparatus 12 of the information processing system 10 according to the present exemplary embodiment. The processing of FIG. 12 starts, for example, in a case where the user logs in to the system and the document stored in the cloud server 16c is selected.

In step S100, the CPU 20A inquires of the confidential information management server 16b whether or not masking of the document to be printed is necessary, and the process proceeds to step S102. That is, the document ID and the access policy ID are transmitted to the confidential information management server 16b, and an inquiry is made as to whether or not masking is performed by the combination of the document ID and the access policy ID.

In step S102, the CPU 20A determines whether or not the masking necessity result has been received from the confidential information management server 16b. The process proceeds to step S104 after waiting until the determination is affirmative.

In step S104, the CPU 20A determines whether or not masking is necessary. In a case where the determination is negative, the process proceeds to step S106, and in a case where the determination is affirmative, the process proceeds to step S108.

In step S106, the CPU 20A executes printing as it is without masking and ends a series of processes.

On the other hand, in step S108, the CPU 20A acquires the keyword to be masked from the confidential information management server 16b and the process proceeds to step S110.

In step S110, the CPU 20A masks the keyword portion, embeds the two-dimensional code for checking in the document, executes printing, and ends a series of processes.

Figure 13:
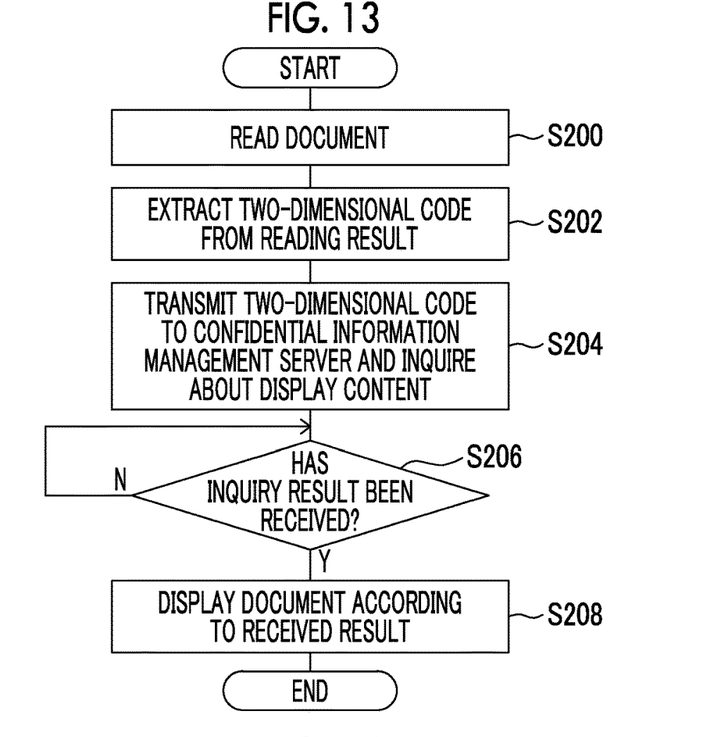
FIG. 13 is a flowchart showing an example of a flow of processing performed in the case of checking the masked content of a document to which a two-dimensional code is added in the image forming apparatus of the information processing system according to the present exemplary embodiment.

Next, processing performed by the image forming apparatus 12 in the case of checking the masked content of the document to which the two-dimensional code is added will be described. FIG. 13 is a flowchart showing an example of a flow of processing performed in the case of checking the masked content of a document to which a two-dimensional code is added in the image forming apparatus 12 of the information processing system 10 according to the present exemplary embodiment. The processing of FIG. 13 starts, for example, in a case where the system is logged in and is instructed to read the document from the image forming apparatus 12.

In step S200, the CPU 20A reads the target document and the process proceeds to step S202.

In step S202, the CPU 20A extracts the two-dimensional code from the reading result and the process proceeds to step S204.

In step S204, the CPU 20A transmits the extracted two-dimensional code to the confidential information management server 16b, inquires about the display content, and the process proceeds to step S206.

In step S206, the CPU 20A determines whether or not the inquiry result has been received. The process proceeds to step S208 after waiting until the determination is affirmed.

In step S208, the CPU 20A displays the document on the user interface 22 according to the received inquiry result, and ends a series of processes. Thereby, the content permitted by the access policy is displayed without being masked.

Figure 14:
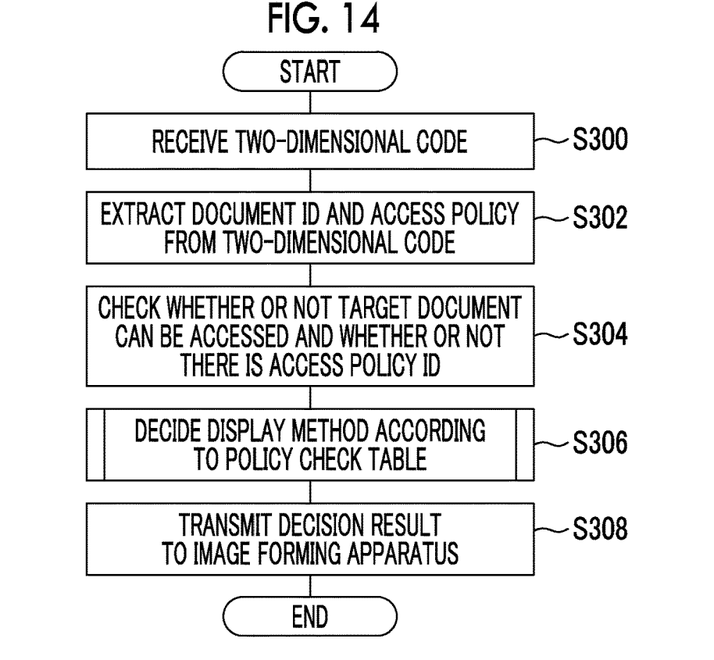
FIG. 14 is a flowchart showing an example of a flow of processing performed by a confidential information management server of the information processing system according to the present exemplary embodiment.

Subsequently, specific processing performed by the confidential information management server 16b will be described. FIG. 14 is a flowchart showing an example of a flow of processing performed by the confidential information management server 16b of the information processing system 10 according to the present exemplary embodiment. The processing of FIG. 14 starts in a case where a two-dimensional code is transmitted from the image forming apparatus 12 and an inquiry about the display content is made.

In step S300, the CPU 16A receives the two-dimensional code transmitted from the image forming apparatus 12 and the process proceeds to step S302.

In step S302, the CPU 16A extracts the document ID and the access policy ID from the two-dimensional code and the process proceeds to step S304.

In step S304, the CPU 16A checks whether or not the target document can be accessed and whether or not there is an access policy ID, and the process proceeds to step S306.

In step S306, the CPU 16A performs a display method decision process according to the policy check table, and the process proceeds to step S308. The details of the display method decision process will be described later.

In step S308, the CPU 16A transmits a decision result of the display method to the image forming apparatus 12, and ends a series of processes.

Figure 15:
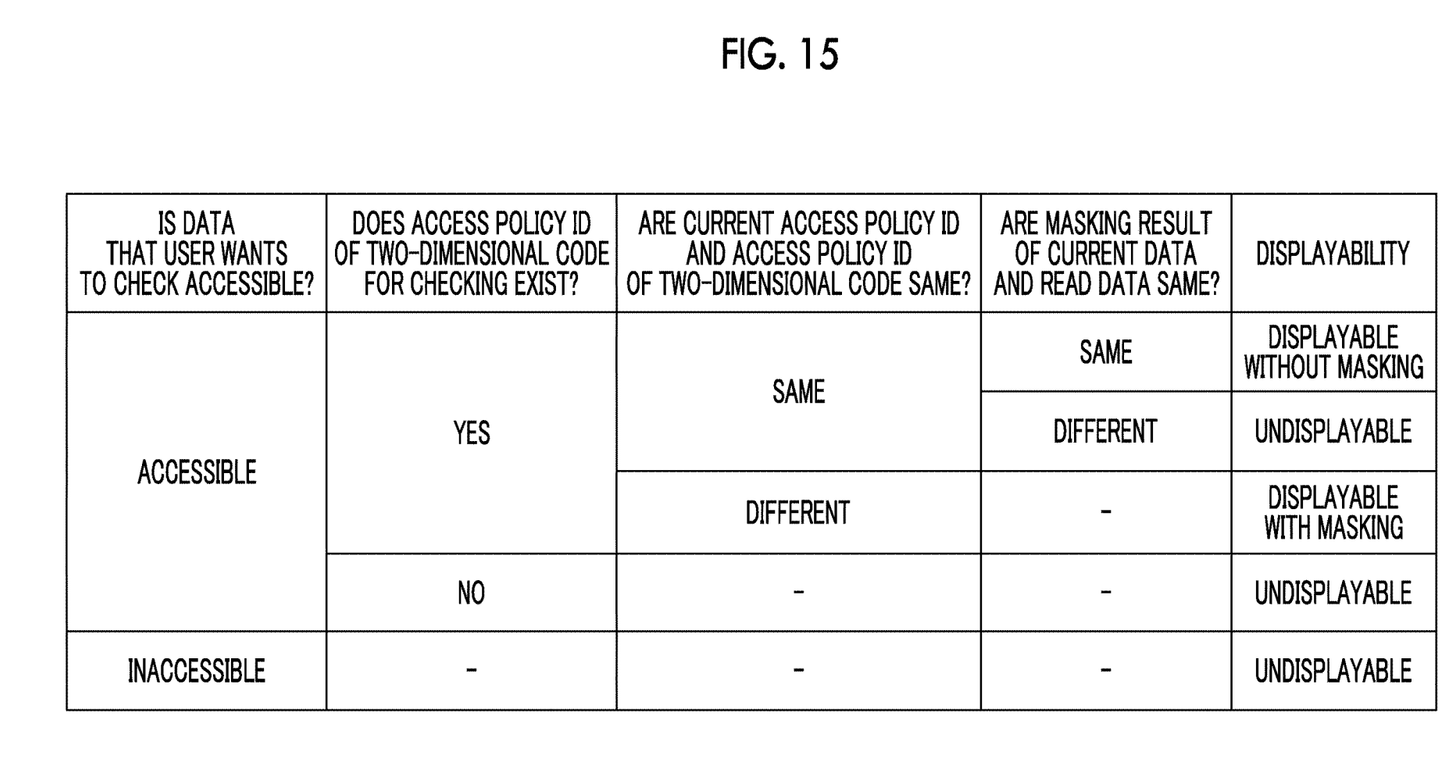
FIG. 15 is a diagram showing an example of a policy check table.

Next, the above-mentioned display method decision process will be described in detail. FIG. 15 is a diagram showing an example of a policy check table to be referred to in the case of performing a display method decision process.

The confidential information management server 16b checks whether or not the user who requested the processing is permitted to access the document corresponding to the document ID from the document ID and the access policy ID extracted from the two-dimensional code, and also checks whether or not the access policy ID exists.

Further, the confidential information management server 16b checks the access policy at the time of log-in, and decides how to display the document according to the content of the policy check table. Then, the result of masking the data on the system is compared with the data read by the image forming apparatus 12, and the document display method is decided according to the content of the policy check table.

Specifically, the matching of each item is checked according to the policy check table shown in FIG. 15. That is, by checking the matching between the current access policy and the access policy ID of the two-dimensional code, it is checked whether or not the data that the user wants to check is accessible. In a case where the data that the user wants to check is inaccessible, the display of the document is decided to be undisplayable.

On the other hand, in a case where the data that the user wants to check is accessible, it is checked whether or not the access policy ID of the two-dimensional code for checking exists, and in a case where the access policy ID of the two-dimensional code does not exist, the display of the document is decided to be undisplayable.

In a case where the access policy ID of the two-dimensional code exists, it is checked whether or not the current access policy ID and the access policy ID of the two-dimensional code are the same, and in a case where the current access policy ID and the access policy of the two-dimensional code are different, it is decided to be displayable with masking according to the current access policy ID.

In a case where the current access policy ID and the access policy ID of the two-dimensional code are the same, it is checked whether or not the masking result of the current data and the data read by the image forming apparatus 12 are the same, in a case where the masking result of the current data and the data read by the image forming apparatus 12 are same, it is decided to be displayable without masking, and in a case where the masking result of the current data and the data read by the image forming apparatus 12 are different, it is decided to be undisplayable. The reason for checking whether or not the masking result of the current data and the data read by the image forming apparatus 12 are the same is as follows. In a case where data for specifying a document such as a two-dimensional code is pasted into another document and read, users can refer to the data despite the users who are not permitted to access the data, and therefore, in order to prevent such behavior, whether or not the masking result of the current data and the data read by the image forming apparatus 12 are the same is checked. Then, in a case where the masking state at the time of first printing and the masking result of the data in the system are the same, the combination of the document, the two-dimensional code, and the accessing user is regarded as correct and the document is displayed.

Here, an example of deciding the display method according to the policy check table of FIG. 15 has been described, but the decision of the display method is not limited thereto. For example, only the matching between the current access policy and the access policy ID of the two-dimensional code may be checked, and in a case where the current access policy and the access policy ID of the two-dimensional code match, the concealed portion may be restored and displayed, and in a case where the current access policy and the access policy ID of the two-dimensional code do not match, the concealed portion may be hidden.

In the above exemplary embodiment, the policy management server 16a, the confidential information management server 16b, and the cloud server 16c are described separately, but the present disclosure is not limited thereto. For example, it may be one server having the functions of each server, or two servers.

Further, in the above exemplary embodiment, the processing of each part has been described as an example, but the processing of each part is not limited to the above description. For example, the policy management server 16a or the image forming apparatus 12 may perform the processing performed by the confidential information management server 16b. In this case, in a case where necessary information is acquired from the confidential information management server 16b, processing can be performed by a server or an apparatus other than the confidential information management server 16b.

Further, in the above exemplary embodiment, as an example of the inquiry information, an example in which a two-dimensional code in which a document ID and an access policy ID are recorded is added to a document and printed has been described, but the inquiry information is not limited to the two-dimensional code. For example, a one-dimensional code in which a document ID and an access policy ID are recorded may be applied. Alternatively, a document ID and an access policy ID may be printed as text strings. In addition, the inquiry information may include information other than the document ID and the access policy ID.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, the processing performed in each part of the information processing system 10 according to the above exemplary embodiment may be processing performed by software, processing performed by hardware, or processing in which both are combined. Also, the processing performed in each part of the information processing system 10 may be stored in a storage medium as a program and distributed.

Further, the present disclosure is not limited to the above description, and it is needless to say that the present disclosure can be variously modified and implemented within a range not deviating from the gist thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor configured to:
in a case of printing data to be printed, perform masking processing on a predetermined concealed portion of the data to be printed according to a predetermined access policy; and
perform a process of embedding and outputting inquiry information for inquiring about the concealed portion in the data to be printed to which the masking processing has been performed,
wherein the inquiry information includes data identification information for identifying the data and access policy identification information for identifying the access policy, and
wherein the processor is configured to:
acquire the inquiry information from a reading result of a printed matter on which the inquiry information is printed,
acquire a current access policy by using the access policy identification information,
restore and display the concealed portion of the data corresponding to the data identification information according to the current access policy, and
make the concealed portion undisplayable without restoring the concealed portion in a case where a masking result of current data and the reading result of the printed matter do not match.

2. The image processing apparatus according to claim 1, wherein the inquiry information is a two-dimensional code in which the data identification information and the access policy identification information are recorded.

3. The image processing apparatus according to claim 1, wherein the processor is configured to restore and display the concealed portion in a case where the current access policy and the access policy identification information of the inquiry information match.

4. The image processing apparatus according to claim 3, wherein the processor is configured to perform the masking processing on the concealed portion and display the masked concealed portion according to the current access policy in a case where the current access policy and the access policy identification information of the inquiry information do not match.

5. The image processing apparatus according to claim 1, wherein the processor is configured to perform the masking processing on the concealed portion and display the masked concealed portion according to the current access policy in a case where the current access policy and the access policy identification information of the inquiry information do not match.

6. The image processing apparatus according to claim 1, wherein the processor is configured to restore and display the concealed portion in a case where the current access policy and the access policy identification information of the inquiry information match, the access policy identification information of the inquiry information exists, a current access policy identification information and the access policy identification information of the inquiry information match, and a masking result of current data and the reading result of the printed matter match.

7. An image processing system comprising:
the image processing apparatus according to claim 1; and
a server that manages the access policy and the concealed portion.

8. A non-transitory computer readable medium storing an image processing program causing a computer to execute a process comprising:
performing, in a case of printing data to be printed, masking processing on a predetermined concealed portion of the data to be printed according to a predetermined access policy; and
embedding and outputting inquiry information for inquiring about the concealed portion in the data to be printed to which the masking processing has been performed,
wherein the inquiry information includes data identification information for identifying the data and access policy identification information for identifying the access policy, and wherein the process further comprises:

acquiring the inquiry information from a reading result of a printed matter on which the inquiry information is printed, acquiring a current access policy by using the access policy identification information, restoring and displaying the concealed portion of the data corresponding to the data identification information according to the current access policy, and making the concealed portion undisplayable without restoring the concealed portion in a case where a masking result of current data and the reading result of the printed matter do not match.

9. An image processing method comprising:

performing, in a case of printing data to be printed, masking processing on a predetermined concealed portion of the data to be printed according to a predetermined access policy; and embedding and outputting inquiry information for inquiring about the concealed portion in the data to be printed to which the masking processing has been performed, wherein the inquiry information includes data identification information for identifying the data and access policy identification information for identifying the access policy, and wherein the image processing method further comprises:

acquiring the inquiry information from a reading result of a printed matter on which the inquiry information is printed, acquiring a current access policy by using the access policy identification information, restoring and displaying the concealed portion of the data corresponding to the data identification information according to the current access policy, and making the concealed portion undisplayable without restoring the concealed portion in a case where a masking result of current data and the reading result of the printed matter do not match.

\* \* \* \* \*